(12) United States Patent
MacLean et al.

(10) Patent No.: US 7,408,369 B2
(45) Date of Patent: Aug. 5, 2008

(54) SYSTEM AND METHOD FOR DETERMINING THERMAL SHUTDOWN CHARACTERISTICS

(75) Inventors: Kenneth George MacLean, Dallas, TX (US); David John Baldwin, Allen, TX (US); David Alexander Grant, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 397 days.

(21) Appl. No.: 11/122,624

(22) Filed: May 5, 2005

(65) Prior Publication Data

US 2005/0248895 A1 Nov. 10, 2005

Related U.S. Application Data

(60) Provisional application No. 60/568,192, filed on May 5, 2004.

(51) Int. Cl.
  *G01R 31/26* (2006.01)
  *G01R 31/28* (2006.01)
(52) U.S. Cl. .................................... 324/765; 324/158.1
(58) Field of Classification Search ................. 327/513; 361/63, 65, 78, 79, 88, 90, 91.1; 702/132
  See application file for complete search history.

(56) References Cited

U.S. PATENT DOCUMENTS

| | | | | |
|---|---|---|---|---|
| 6,020,792 A | * | 2/2000 | Nolan et al. | 331/111 |
| 6,621,678 B2 | * | 9/2003 | Wei et al. | 361/103 |
| 7,113,881 B2 | * | 9/2006 | Boerstler et al. | 702/117 |
| 7,127,368 B2 | * | 10/2006 | Choi | 702/130 |
| 2002/0097541 A1 | * | 7/2002 | Wei et al. | 361/58 |

* cited by examiner

*Primary Examiner*—Ha Nguyen
*Assistant Examiner*—Joshua Benitez
(74) *Attorney, Agent, or Firm*—William B. Kempler; W. James Brady, III; Frederick J. Telecky, Jr.

(57) ABSTRACT

Systems and methods are disclosed to enable determining thermal protection characteristics of an integrated circuit. In one embodiment, an integrated circuit includes a proportional to absolute temperature (PTAT) generator that provides a PTAT signal that varies as a function of temperature. Thermal protection control system provides an output signal indicative of a thermal protection condition based at least in part on the PTAT signal. A monitoring system that provides a path to enable selective measuring of at least one signal associated with operation of the thermal protection control system.

12 Claims, 3 Drawing Sheets

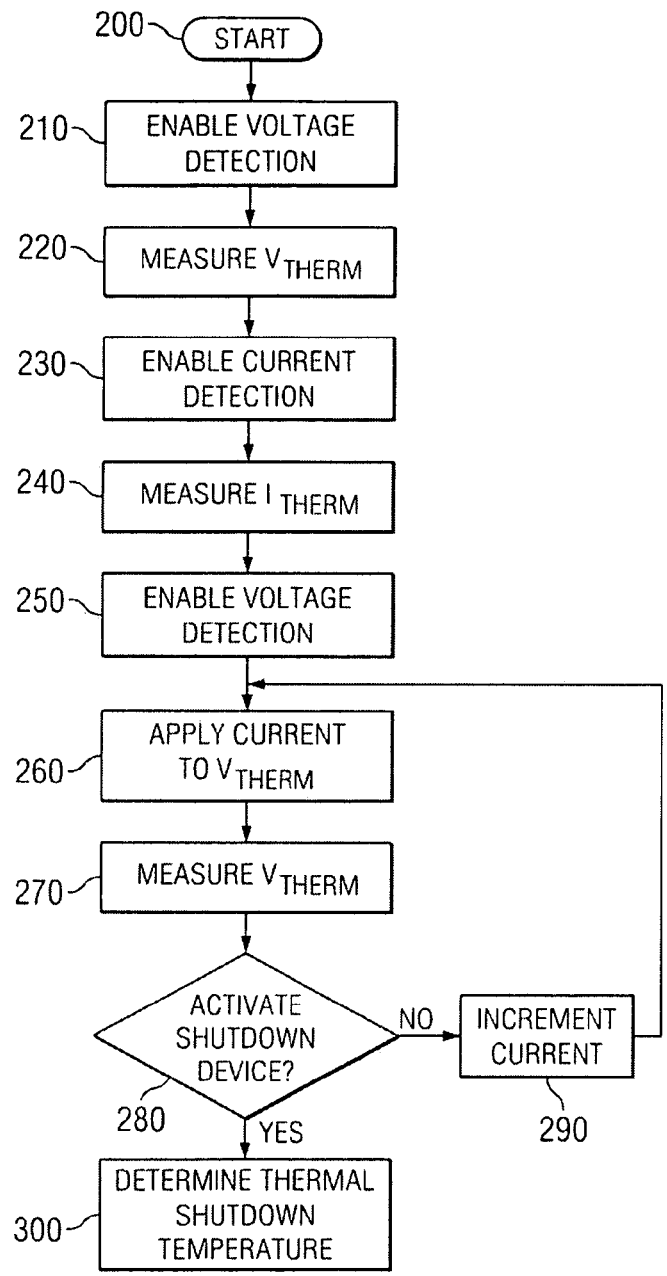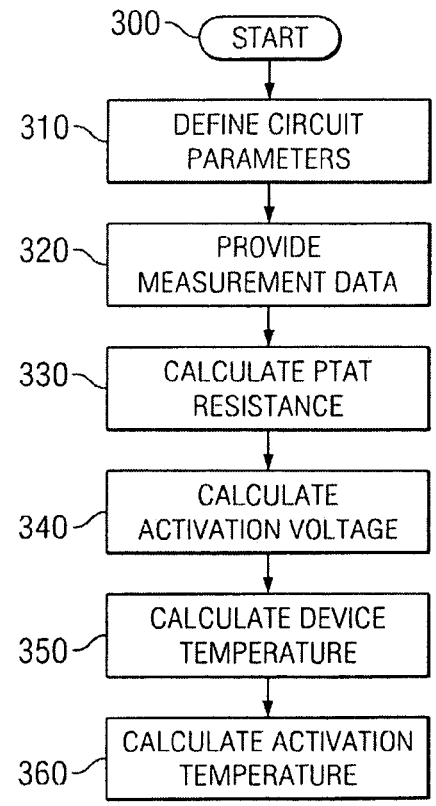

SYSTEM AND METHOD FOR DETERMINING THERMAL SHUTDOWN CHARACTERISTICS

CROSS-REFERENCE TO RELATED APPLICATIONS

This application claims the benefit of application Ser. No. 60/568,192 filed May 5, 2004.

TECHNICAL FIELD

The present invention is directed generally to integrated circuits and more particularly to systems and methods for determining thermal shutdown characteristics.

BACKGROUND

Thermal shutdown is utilized as one of several possible mechanisms for protecting integrated circuits (ICs) from high operating temperatures, such as may occur at high current loads or other high power dissipation events. To implement desired protection, thermal shutdown control circuitry can be located near expected high power dissipation regions of an IC. The thermal shutdown control circuitry usually includes a PTAT (proportional to absolute temperature) circuit, such as a current PTAT (or IPTAT) circuit. The IPTAT circuit provides an output current that is proportional to the absolute temperature of the components constituting the circuit. The output current can be utilized to drive associated detection circuitry that provides a control signal for implementing thermal shutdown and disabling the affected components of the functional circuitry.

While thermal shutdown control circuitry is routinely utilized in many types of integrated circuits, the operation of thermal shutdown control circuitry is not routinely tested in the normal course of IC fabrication. This is because proper testing generally would require raising the temperature of the IC device to the thermal shutdown activation temperature. For example, one might physically raise temperature of the device, such as by placing the device in an oven, while testing the associated protection circuitry to determine whether the device properly disables. In addition to the added stress on the IC device, by implementing such a test on a frequent basis would prove time consuming. As a result, such an approach is generally cost prohibitive for most fabrication processes since device yield could significantly decrease.

Accordingly, rather than testing operation of the thermal detection circuitry, most existing test procedures operate to determine whether the associated protection mechanism functions properly. These approaches typically control and override thermal shutdown signal, such that the protection circuitry, when operating properly, is activated to disable the functional circuitry in the device. However, these approaches provide no quantitative mechanism to ascertain at what temperature the protection will become active.

SUMMARY

An approach is provided to enable determining thermal protection characteristics of an integrated circuit.

One aspect of the present invention provides an integrated circuit that includes a proportional to absolute temperature (PTAT) generator that provides a PTAT signal that varies as a function of temperature. Other aspects of the present invention are to provide: a thermal protection control system that provides an output signal indicative of a thermal protection condition based at least in part on the PTAT signal, and a monitoring system that provides a path to enable selective measuring of at least one signal associated with operation of the thermal protection control system.

The integrated circuit can be at any stage of fabrication, such as from an intermediate stage to a final packaged circuit.

Another aspect of the present invention provides a system for determining an operating characteristic of an integrated circuit. The system includes a monitoring system operatively associated with the integrated circuit to enable measuring of at least one electrical parameter corresponding to operation of a thermal protection system that is operatively associated with the integrated circuit. A calculator computes at least one thermal protection characteristic of the thermal protection system based on measurements of the at least one electrical parameter.

Yet another aspect of the present invention provides a method for determining thermal protection characteristics of an integrated circuit. The method includes energizing a thermal protection system of an integrated circuit as a function of temperature. At least one electrical parameter associated with operation of the thermal protection system is selectively measured and a thermal activation characteristic of the thermal protection system is determined based on the measured at least one electrical parameter.

The systems and methods may be implemented for an integrated circuit at any stage of fabrication, such as from an intermediate stage to a final packaged circuit and at substantially ambient temperature. As a result, thermal activation temperature can be determined economically, such as it can be employed as part of routine testing for integrated circuits.

BRIEF DESCRIPTION OF THE DRAWINGS

The foregoing and other aspects of the present invention will become apparent to those skilled in the art to which the present invention relates upon reading the following description with reference to the accompanying drawings.

FIG. 4 is a flow diagram of a method for determining a thermal shutdown temperature in accordance with an aspect of the present invention.

FIG. 5 is flow diagram of another method for determining a thermal shutdown temperature in accordance with an aspect of the present invention.

DETAILED DESCRIPTION

Figure 1:
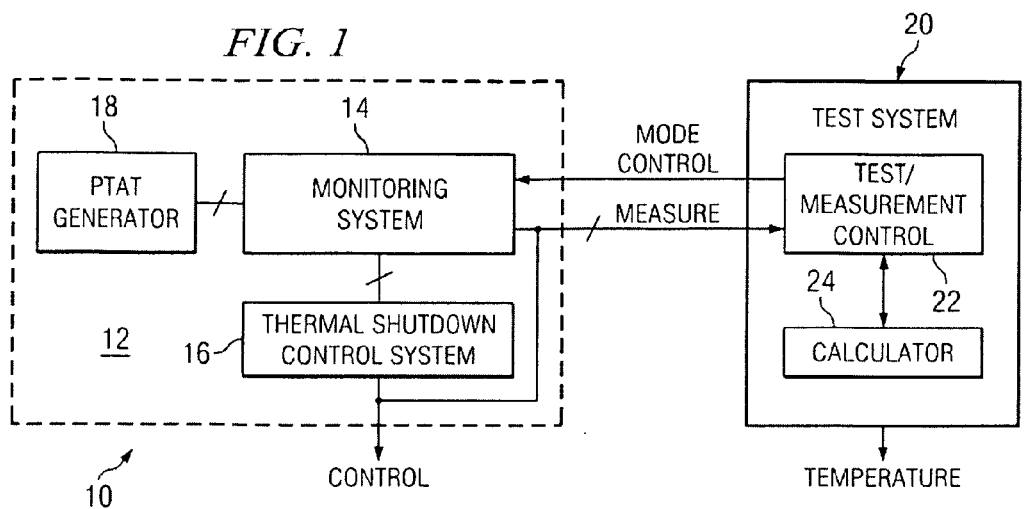
FIG. 1 is a block diagram illustrating a system for detecting thermal shutdown characteristics in accordance with an aspect of the present invention.

FIG. 1 depicts an example of a system 10 that can be utilized for determining at least one thermal shutdown characteristic according to an aspect of the present invention. The system 10 can be utilized, for example, to ascertain a thermal shutdown temperature for one or more integrated circuits (IC's), indicated schematically at 12. The IC 12 can be a final packaged IC or, alternatively, the IC may be at an intermediate stage of fabrication, such that the IC 12 forms part of a wafer that includes a plurality of IC's (e.g., prior to die cutting).

The system 10 includes a monitoring system 14 that ascertains an indication of at least one electrical parameter associated with operation of a thermal protection control system 16. A proportional to absolute temperature (PTAT) source 18 provides a signal to energize (or drive) the thermal shutdown system 16. For example, the PTAT source 18 provides an output signal that is functionally related (e.g., proportional to temperature of the portion of the integrated circuit 12 (e.g., the semi-conductor substrate) where the PTAT 18 is located. Those skilled in the art will understand and appreciate the various implementations of PTAT devices that could be utilized to provide a signal suitable for thermal detection.

In the example of FIG. 1, the monitoring system 14 is operative to monitor electrical parameters associated with the thermal protection control system 16. The electrical parameters can include voltage and/or current associated with operation of the thermal shutdown system 16. The electrical parameters thus vary as a function of the signal provided by the PTAT source 18. In addition to the signal provided by the PTAT source varying as a function of temperature of the integrated circuit 12, the operation of the thermal shutdown system 16 also can include one or more components (e.g., a transistor whose turn on voltage threshold has a negative temperature coefficient) having an operating condition that varies as a function of temperature.

During normal operation of the IC 12, the thermal shutdown system 16 is operative to provide a CONTROL signal in response to the temperature of the associated IC 12 (such as at one or more IC hot spots) exceeding a threshold level. The threshold level can be set based on the proportional nature (or sensitivity) of the PTAT source and the temperature coefficient characteristics associated with the one or more components implemented in the thermal protection control system 16. Other circuitry (not shown) associated with the integrated circuit 12 can implement appropriate shutdown functions to disable functional circuitry in the IC based on the CONTROL signal.

According to an aspect of the present invention, the system 10 can be employed during a test mode associated with the integrated circuit 12. The system 10 includes a test system 20 that is operative to control the monitoring system 14 in connection with the test mode. For instance, the test system 20 is operative to activate the monitoring system 14 during the test mode for measuring internal signals associated with the thermal shutdown system 16. The test system 20 is also configured to calculate a thermal shutdown temperature associated with the thermal protection control system 16 based on the internal signals measured during the test mode. The internal signals comprise electrical parameters, such as indications of voltage and current, associated with operation of the thermal shutdown system 16.

In the example of FIG. 1, the test system 20 includes a test/measurement control block 22 that is operative to provide one or more MODE CONTROL signals to control the monitoring system 14 in connection with a corresponding test mode. The test mode can include a plurality of test phases. For example, in one phase, the test/measurement control block 22 provides one or more MODE CONTROL signals to the monitoring system 14. The MODE CONTROL signal can be used to selectively monitor the signal from the PTAT source 18 with the thermal protection control system 16. For example, to measure current being sourced from the PTAT source 18, the test/measurement control block 22 can provide a first MODE CONTROL signal to the monitoring system 14 to re-route current from the PTAT source 18 to an appropriate current sensing device of the test/measurement control block 22. In this way, the test system 20 can measure the current (or other signal) provided by the PTAT source 18.

In a second test phase, the test/measurement control block 22 can also provide a second MODE CONTROL signal to the monitoring system 14 to selectively couple the test/measurement control block for measuring an internal voltage signal associated with operation of the thermal protection control system 16. For instance, the internal voltage signal can correspond to a bias signal at a control node associated with controlling activation of an internal component that provides the CONTROL signal indicative of a thermal shutdown state of the IC 12.

The test/measurement control block 22 can also operate in a third test phase in which the test/measurement control block 22 provides one or more MODE CONTROL signals to the monitoring system 14 to provide a path for injecting current into the thermal protection control system 16. The test/measurement control block 22 also monitors the voltage at the control node associated with activating the internal component of the internal protection control system 16. The injected current can be increased in a manner to simulate an increasing temperature associated with the integrated circuit 12, without significantly increasing the temperature of the integrated circuit. The test/measurement control block 22 thus can measure the internal control voltage of the thermal protection control system 16 and store a value indicative of the control voltage that results in activation (e.g., a state change in the CONTROL signal) of the thermal protection control system.

The measured electrical parameters can be stored (e.g., in appropriate memory of the test system 20) for use by a calculator 24. The calculator 24 is programmed and/or configured to compute thermal shutdown characteristic based on the measurements obtained by the test/measurement control block 22, such as obtained during the phases of the test mode. The calculator 24 can perform the computations, for example, to determine a value corresponding to a thermal shutdown temperature for the thermal protection control system 16.

As an example, the calculator 24 can determine the thermal shutdown temperature for the thermal protection control system 16 as a function of electrical parameters associated with the thermal protection control system 16. The electrical parameters can include the output signal (e.g., current) provided by the PTAT source 18 and the internal control voltage for the thermal shutdown system 16, both for a normal operating condition as well as for the increased current required to activate the thermal protection control system 16.

As mentioned above, those skilled in the art will understand and appreciate that such a test process can be implemented at various stages of the fabrication process. For example, an appropriate test system 20 can be operatively coupled to a wafer containing a plurality of the IC's 12, with the monitoring system 14 providing appropriate pads or other connectors for enabling monitoring of the internal signals of the thermal protection control system 16. Alternatively or additionally, the test system 20 can be configured (e.g., as part of Automatic Test Equipment (ATE)) utilized to perform final testing of an encapsulated integrated circuit component, such as through one or more pins or other terminals. The pins can correspond to specialized test pins or multi-purpose pins utilized for test purposes and for circuit operation.

Figure 2:
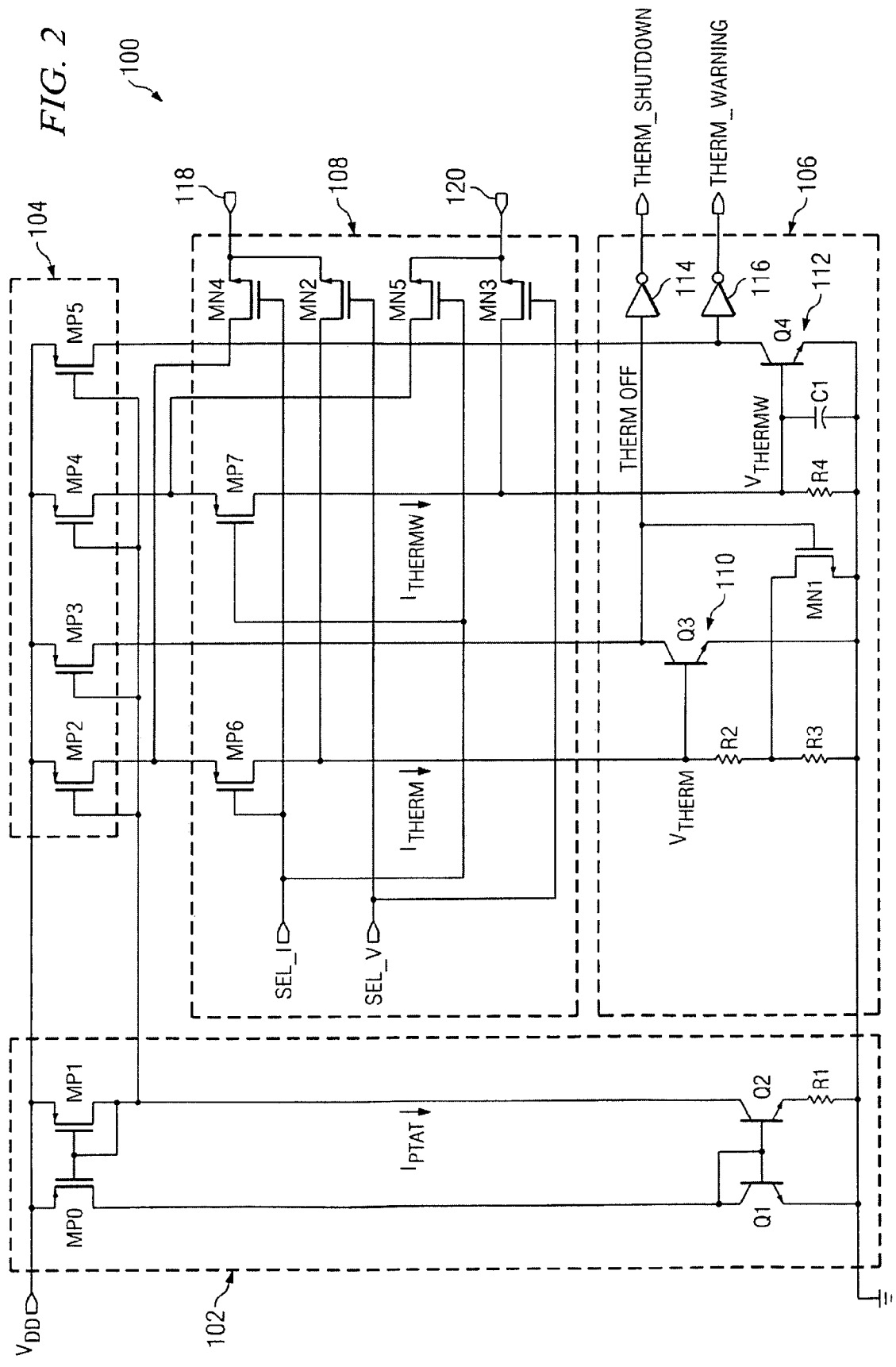
FIG. 2 is an example of a circuit diagram of a thermal shutdown system that facilitates determining thermal shutdown characteristics in accordance with an aspect of the present invention.

FIG. 2 depicts an example of a thermal shutdown detection system 100 that can be implemented in accordance with an aspect of the present invention. The system 100 includes an IPTAT generator 102 that generates a current $I_{PTAT}$ that is proportional to a temperature of the substrate in which the IPTAT generator 102 is implemented. The IPTAT generator 102 is coupled to bias a current mirror network 104 based on the $I_{PTAT}$ current. The current mirror network 104 provides corresponding current $I_{THERM}$ and $I_{THERMW}$ to associated thermal shutdown control circuitry 106. A monitoring system 108 is coupled between the current mirror network 104 and the thermal shutdown control circuitry 106. The monitoring system 108 is operative to selectively monitor internal signals associated with the thermal shutdown control circuitry 106. The thermal shutdown control circuitry 106 is configured to provide one or more control output signals at corresponding outputs, indicated at THERM_SHUTDOWN and THERM_

WARNING. Each of THERM_SHUTDOWN and THERM_WARNING signals can be considered thermal protection control signals.

Figure 3:
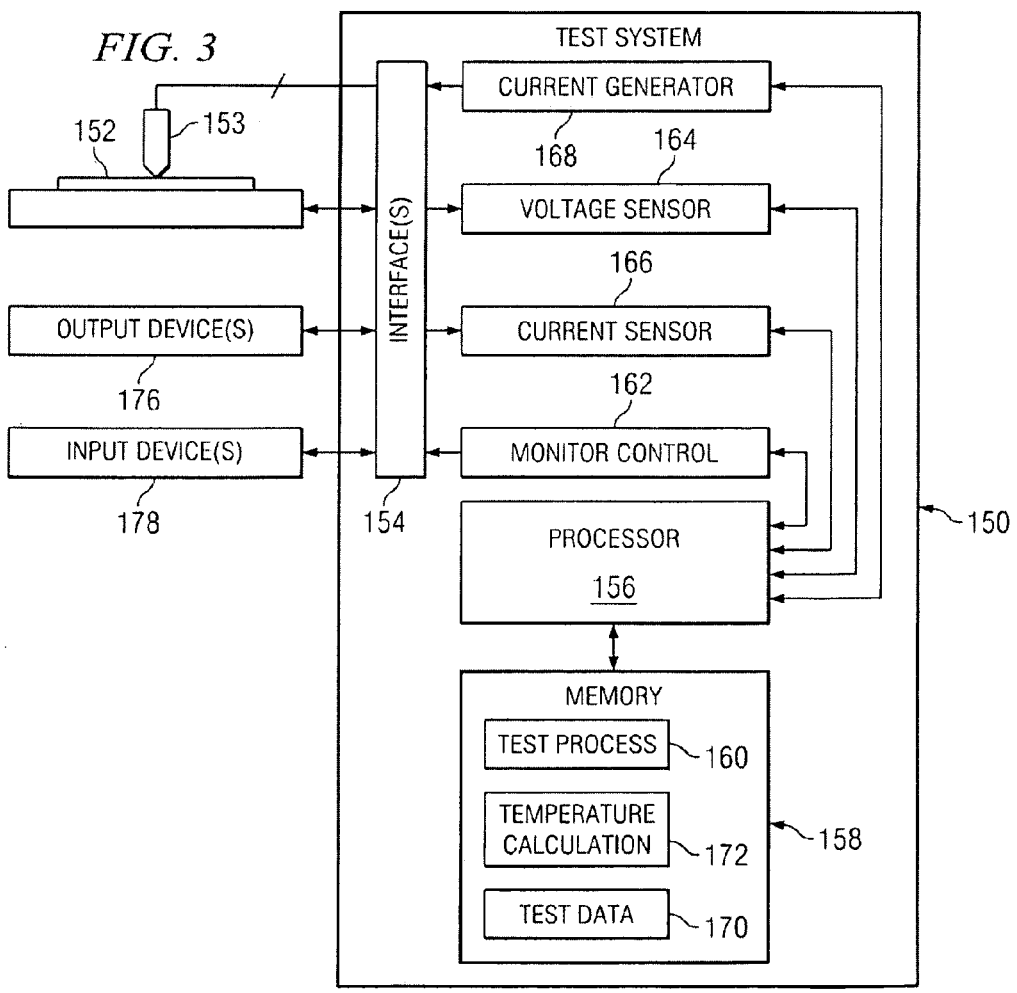
FIG. 3 is a block diagram of a test system operative to determine thermal shutdown characteristics in accordance with an aspect of the present invention.

The IPTAT generator 102 is coupled between $V_{DD}$ and electrical ground. In the example of FIG. 3, the IPTAT generator 102 includes MOSFETs (metal oxide semiconductor field effect transistors) MP0 and MP1 having their respective sources coupled to $V_{DD}$ and their gates coupled together. The drain of MP0 is coupled to bi-polar transistor Q1, which is coupled between the drain of MP0 and electrical ground. The collector of Q1 is shorted to its base, which is further coupled to the base of another bi-polar transistor Q2. Q2 is coupled in series with a resistor R1 between MP1 and electrical ground. The output current from this circuit is defined by:

$$IPTAT = (1/R1)*(kT/q)*(ln(A))$$

where A is the ratio of the emitter areas between Q2 and Q1.

It is clear by inspection that this expression, being linear with respect to the absolute temperature term T, is PTAT.

As mentioned above, $I_{PTAT}$ biases the current mirror network 104. In particular, the voltage at the drain of MP1 (or the voltage drop across Q1 and R1) biases a plurality of respective MOSFET devices of the current mirror. That is, the drain of MP1 is coupled to the gates of respective transistors MP2, MP3, MP4 and MP5. As an example, each of the respective transistors, MP2, MP3, MP4 and MP5 can be identical transistors such that each of the transistors can source an identical current to the monitoring system and the corresponding thermal shutdown control circuitry 106 based on $I_{PTAT}$ (e.g., $I_{THERM} = I_{THERMW}$).

The drain of MP2 is coupled to the thermal shutdown control circuitry 106 through MOSFETS MP6 and MP4 is coupled to the circuitry 106 through MOSFET MP7. MP3 and MP5 are also coupled to source corresponding current to the thermal shutdown control circuitry 106. During normal operation, each of MP2 and MP4 sources current $I_{THERM}$ and $I_{THERMW}$ to respective portions 110 and 112 of the thermal shutdown control circuitry 106. Thus, $I_{THERM}$ sourced from MP2 results a corresponding voltage $V_{THERM}$ at an input of corresponding portion 110 of the thermal shutdown circuitry 106. Similarly, MP4 sources current $I_{THERMW}$ to provide a voltage $V_{THERMW}$ at an input of the corresponding portion 112 of the thermal shutdown control circuitry 106. In the example of FIG. 2, the part of the circuitry 110 is operative to provide the thermal shutdown control signal (THERM_SHUTDOWN) and the circuitry 112 is operative to provide an early warning control signal (THERM_WARNING).

The thermal shutdown control circuitry 110 includes bi-polar transistor Q3 having its collector coupled to the drain of MP3 and a base coupled to a control mode at $V_{THERM}$ and its emitter coupled to ground. Additionally, the base of Q3 is coupled to ground through a series combination of resistors R2 and R3. The node interconnecting R2 and R3 is also coupled to a drain of MOSFET transistor MN1, which is coupled to short out R3 as a function of a corresponding THERM OFF signal at the collector of Q3. The collector of Q3 also is coupled to an inverter 114 that is operative to provide the THERM_SHUTDOWN control signal by inverting the THERM OFF signal.

MN1 provides hysteresis for stabilizing the operation of the thermal shutdown control transistor Q1 in response to detecting a thermal shutdown condition. For example, when $V_{THERM}$ increases above the $V_{BE}$ threshold voltage of Q3, Q3 is activated to change the state at the collector of Q3 (e.g., pull THERM OFF from HIGH to LOW). In response to THERM OFF being pulled low through Q3, MN1 is turned OFF, such that $V_{THERM}$ increases since $I_{THERM}$ is provided across the series combination of both R2 and R3. Consequently, small fluctuations in $V_{THERM}$ near the $V_{BE}$ threshold of Q3 will not result in state changes for THERM OFF.

The thermal warning control circuitry 112 is similarly configured. In particular, the circuitry 112 includes bi-polar transistor Q4 coupled between MP5 and electrical ground. The $V_{THERMW}$ voltage is provided to the base of Q4, which is coupled to ground through a parallel arrangement of resistor R4 in capacitor C1. Thus, as the voltage $V_{THERMW}$ increases above the $V_{BE}$ threshold voltage of Q4, Q4 is activated to change the state of the signal at the collector of Q4. An inverter 116 inverts the signal at the collector of Q4 to provide the THERM_WARNING control signal.

The monitoring system 108 includes a network of MOSFET devices MN2, MN3, MN4 and MN5 that are controlled as a function of selection input signals SEL_I and SEL_V to enable selective monitoring of internal signals of the thermal protection control circuitry 106. That is, the selective activation of MN2, MN3, MN4 and MN5 provides paths to monitor desired internal signal of the thermal shutdown control circuitry 106. The monitoring system 108 also includes MP6 and MP7. In FIG. 2, the control input SEL_V is coupled to the gates of MN2 and MN3. MN2 is coupled between an output 118 and the $V_{THERM}$ signal at the base of Q3. MN3 is coupled between another output 120 and the base of Q4 corresponding to the voltage $V_{THERMW}$. Thus, by providing a high input control signal at SEL_V, the internal voltages $V_{THERM}$ and $V_{THERMW}$ of the control circuitry 106 can be monitored at the respective outputs 118 and 120.

The SEL_I control input is coupled to the gates of MN4 and MN5, as well as to the gates of MP6 and MP7. Thus, by setting SEL_I to a high voltage (e.g., $V_{DD}$), MP6 and MP7 are turned off and the currents being sourced by MP2 and MP4 to the thermal shutdown control circuitry 106 are re-routed through MN4 and MN5 to the corresponding outputs 118 and 120, respectively. Accordingly, by setting SEL_I high, the currents $I_{THERM}$ and $I_{THERMW}$ can be monitored by appropriate current sensing circuitry coupled at the outputs 118 and 120.

The monitoring system 108 can be employed by a corresponding test system (not shown), which can be separate from an IC that comprises the system 100 or alternatively, it can be integrated into the IC that comprises the system 100. The test system can operate the monitoring system 108 in different test phases during a test mode to measure electrical operating characteristics. Thermal shutdown temperatures for triggering one or both of the THERM_SHUTDOWN and THERM_WARNING control signals can be determined from the measured electrical operating characteristics.

By way of further example, in one phase, the SEL_V input is activated HIGH while SEL_I is LOW. In this phase, the outputs 118 and 120 are selectively coupled for measuring $V_{THERM}$ and $V_{THERMW}$. The values of the respective voltages can be sensed by corresponding sensing circuitry and stored for subsequent processing. In a second phase, SEL_I input is activated HIGH while SEL_V is driven LOW. Consequently, in the second phase, the currents $I_{THERM}$ and $I_{THERMW}$ are provided to the respective outputs 118 and 120 at which they can be measured by corresponding current sensing devices (not shown). The sensed values of the respective currents $I_{THERM}$ and $I_{THERMW}$ can be stored for subsequent processing.

In a third test phase, the system can be configured as in the first phase, namely, the SEL_V input is activated HIGH while SEL_I is LOW. However, in addition to measuring voltages $V_{THERM}$ and $V_{THERMW}$, current can be injected into each of the portions 110 and 112 of the thermal shutdown control circuitry 106 via the terminals 118 and 120 coupled to MN2 and MN3. The current injected to each of the portions 110 and 112 can be increased in a manner to simulate an increasing temperature, without actually significantly increasing the temperature of the integrated circuit. The injected currents can be increased until $V_{THERM}$ and $V_{THERMW}$ are sufficient to trigger activation of Q3 and Q4, respectively. $V_{THERM}$ that activates Q3 and $V_{THERMW}$ that activates Q4 can be sensed and stored for subsequent processing. The electrical operating parameters from the three phases noted above can then be employed to compute the thermal shutdown temperature and the thermal warning temperatures, as described herein.

FIG. 3 depicts an example of a test system 150 that can be utilized to determine thermal protection characteristics for one or more integrated circuits 152, such as including the IC's of FIGS. 1 and 2. The integrated circuit(s) 152 can correspond to an encapsulated integrated circuit at a final stage of fabrication or, alternatively, it can correspond to a wafer at an intermediate fabrication stage prior to final encapsulation and packaging.

The test system 150 is connected to one or more monitoring systems associated with thermal shutdown circuitry of the IC 152. The test system 150, for example, can connect with the monitoring system of the IC 152 via one or more electrical paths, such as one or more pins and/or one or more probes, schematically indicated at 153. The one or more paths 153 provide a mechanism for communicating desired information between the IC 152 and the test system 150. Those skilled in the art will understand and appreciate various types and configurations of devices that can provide suitable paths to communicatively couple the test system 150 with the monitoring system of the IC 152.

The test system 150 can correspond to an ATE system, such as can be utilized for monitoring or measuring operating characteristics of integrated circuits. Those skilled in the art will understand and appreciate various types of test systems and test equipment that can be implemented for determining thermal shutdown characteristics, such as shutdown activation temperature, in accordance with an aspect of the present invention. Various components of the test system 150 are coupled to the IC 152 via associated interfaces, indicated collectively and schematically at 154.

In the example of FIG. 2, the test system 150 is a microprocessor-based test system that includes a processor 156 coupled to associated memory 158. For instance, a portion of the test system 150 can include a personal computer or workstation programmed and/or configured to implement the test methodologies described herein. The memory 158 can include read-only memory (ROM), random access memory (RAM), as well as non-volatile memory, such as a flash memory, magnetic or optical storage media.

The memory 158 is programmed with a test process 160 that defines test parameters for implementing the respective test process that is utilized to monitor and control selected parts of the IC 152, such as including, but not limited to, a monitoring system thereof. The processor 156 executes the instructions provided by the test process 160 for controlling various test components of the IC 152.

By way of example, the processor 156 executes the test process 160 to control a monitor control block 162. The monitor control block 162 is operative to provide one or more control signals to the associated monitoring system of the IC 152. As described herein, the monitor control signal(s) selectively configures circuitry on the IC to 152 facilitate monitoring and control of internal signals of the associated thermal shutdown control circuitry.

The processor 156 is also coupled to one or more sensors, such as including a voltage sensor 164 and a current sensor 166, for obtaining values of internal voltage and current signals associated with operation of the thermal shutdown circuitry of the IC 152. The test system 150 also includes a current generator 168 that is operative to provide current to the thermal shutdown control circuitry of the IC 152 for simulating an increase in temperature. The processor 156 controls the current generator 168 to implement the increase in temperature accordingly. The particular electrical parameter(s) being sensed by sensors 164 and 166 and the operation of the current generator 168 generally will depend on to the phase of the test process 160 being executed. The processor 156 can store the sensed electrical parameters (e.g., voltage and current) as test data 170 in the memory 158.

By way of further example, the test process 160 can be implemented for the thermal shutdown circuitry in three general phases, the order of which can vary from that shown and described herein. In a first phase of the test process 160, the processor 156 activates the monitor control block 162 to provide a path for measuring an internal thermal voltage signal while the thermal protection circuitry is energized. The measured thermal voltage signal(s) can be stored in the test data 170. After the voltage signal has been appropriately measured, the processor 156 can implement a second phase of the test process 160 in which the monitor control block 162 selectively routes a PTAT current through the interface 154 to the current sensor 166. The current sensor 166, for example, can be implemented as an ammeter having a very low (e.g., approximately zero) resistance. The measured current can be stored in the test data 168.

In a third phase of the test process 160, the processor 156 activates the monitor control block 162 to implement the same selective connections to enable monitoring of the thermal voltage signal by the voltage sensor 164 (as in the first phase), but also activates the current generator 168 for sourcing additional current to the thermal shutdown circuitry. The injected current adds to the normal operating PTAT current, such as provided in the first phase of the test process. For example, the processor 156 can cause the current generator 168 to increase (e.g., incrementally) the current injected into the thermal shutdown circuitry to simulate an increase in temperature. The current generator 166 can increase the current provided to the thermal shutdown circuitry until the thermal shutdown circuitry is activated, thereby changing states. As described herein, the thermal shutdown circuitry changes state in response to the internal thermal activation voltage exceeding a threshold. The threshold associated with activating the thermal shutdown circuitry, for example, can be fixed or it can be variable. For instance, the threshold of the output component (e.g., a transistor) can vary as a function of component temperature due to a negative temperature coefficient associated with the corresponding component.

The processor 156 also implements a temperature calculation algorithm 172, which can be programmed in the memory 158. After the test data 170 has been obtained, the processor 156 employs the temperature calculation algorithm 172 to ascertain an indication of the thermal shutdown temperature for the thermal shutdown circuitry of the IC 152. The temperature calculation algorithm 172 can compute the thermal shutdown temperature based on the stored test data 170, including the measured voltage and current provided by the voltage sensor 164 and current sensor 166 and an indication of the current injected into the thermal shutdown circuitry of the IC 152 by the current generator 168.

One or more output devices and one or more input devices can be associated with the test system 150. The output devices 176 can be employed by a user to output test results as well as to provide a visual (graphical and/or textual) display associated with the test process. Examples of output devices include monitor or other display device, printers and the like. The user can also employ the one or more user input devices (e.g., mouse, keyboard, custom switches and the like) 178 to configure and input known parameters and test variables for the one or more IC's 152 being tested.

For purposes of simplicity of explanation, an example of a temperature calculation algorithm will be described with respect to the thermal protection system 100 shown and described with respect to the circuit diagram of FIG. 2. The algorithm can be implemented, for example, by the test system 150 of FIG. 3 or other associated equipment, which may be separate from or integrated into the IC implementing thermal shutdown control circuitry.

In the context of the system 100 of FIG. 2, the following nominal circuit parameters are utilized:

$R1 = 24*10^3 \,\Omega$ $R2 = 52*10^3 \,\Omega$ $R3 = 69*10^3 \,\Omega$

Thermal coefficients RTC1 an RTC2 for the resistors R1, R2, and R3 further can be expressed in terms of linear and quadratic components, respectively, as follows:

RTC1 = 2000 ppm/C

RTC2 = 7 ppm/C

Additionally, the following constants are utilized for determining thermal shutdown activation temperatures, namely Boltzman's constant $k = 1.38*10^{-23}$ J/K and a nominal value for an electron charge $q = 1.6*10^{-19}$ C. A negative temperature coefficient $V_{BE}TC$ associated with the base-emitter threshold voltage $V_{BE}$ for the NPN bipolar transistors (Q3 and Q4) can be:

$V_{BE}TC = -2.1*10^{-3}$ V/° C.

For purposes of this example, the nominal (e.g., ambient) temperature of will be assumed to be about 27° C. or about 300 Kelvin.

As described herein, measurements of voltage and current can be obtained by selectively activating a monitoring system to sense the values in distinct phases of the test process. Examples of the sensed current measurements were:

$I_{THERM} = 4.57*10^{-6}$ A, and $I_{THERMW} = 4.63*10^{-6}$ A.

Assuming that the system 100 is configured so that $I_{THERM}$ and $I_{THERMW}$ should be identical, a more accurate approximation for the currents can be obtained from the average of the respective currents, such as:

$$I_{THERM\_AVE} = \frac{I_{THERM} + I_{THERMW}}{2} = 4.6*10^{-6} A$$

Similarly, for the sensed voltages during normal operation were as follows:

$V_{THERM} = 0.213$ V and $V_{THERMW} = 0.279$ V.

As described herein, a third set of electrical parameters are associated with the additional current $I_{ADD\_THERM}$ and $I_{ADD\_WARN}$ injected into the system 100 to activate Q3 and Q4, respectively. Continuing with the example, the additional current to activate Q3 and corresponding voltage were as follows:

$I_{ADD\_THERM} = 7.95*10^{-6}$ A $V_{THERM} = 0.595$ V

Similarly, the additional current $I_{ADD\_WARN}$ to activate Q4 and corresponding voltage $V_{THERMW}$ were as follows:

$I_{ADD\_WARN} = 4.85*10^{-6}$ A $V_{THERMW} = 0.581$ V.

In view of the above measured values and nominal values, actual resistances for R2 ($R2_{CALC}$) and R4 ($R4_{CALC}$) can be determined as follows:

$$R2_{CALC} = \frac{V_{THERM}}{I_{THERM}} = 4.661*10^4 \Omega, \text{ and}$$

$$R4_{CALC} = \frac{V_{THERMW}}{I_{THERMW}} = 6.026*10^4 \Omega$$

The calculated resistances can be compared to the nominal values to ascertain a tolerance associated with the resistance values. An average of the tolerances for resistances R2 and R4 can then be employed to determine a corresponding resistor tolerance for the PTAT resistor R1. The tolerances for R2_tol and R4_tol can be computed as follows.

$$R2\_tol = 100 \cdot \left[\frac{R2_{CALC}}{R2} - 1\right] = -10.37\%$$

$$R4\_tol = 100 \cdot \left[\frac{R4_{CALC}}{R4} - 1\right] = -12.67\%$$

A value corresponding to the average of the resistor tolerances R2_tol and R4_tol, which includes effects of temperature coefficients, can be determined as follows:

$$Rtol = \frac{(R2\_tol + R4\_tol)}{2} = -11.52\%$$

Assuming, a uniform tolerance across the resistive structure in the IC, Rtol can be utilized to determine a calculated value for the PTAT resistor R1, as follows:

$$R1\_calc = R1 \cdot 1 + \frac{Rtol}{100} = 2.124*10^4 \Omega.$$

The transistor threshold voltages $V_{BE\_TH\_Q3}$ and $V_{BE\_TH\_Q4}$ for activating Q3 and Q4 can then be computed based on the total currents through the corresponding resistors at their respective activation, as follows:

$V_{BE\_TH\_Q3} = (I_{THERM} + I_{ADD\_THERM})*R2\_calc = 0.584$ V, and $V_{BE\_TH\_Q4} = (I_{THERMW} + I_{ADD\_WARN})*R2\_calc = 0.571$ V.

An indication of the actual device temperature (Tdev) during the respective measurements can be determined, assuming Q4 has six times the area of Q3 ($Q4_{AREA} = 6*Q3_{AREA}$), as follows:

$$Tdev = \frac{I_{THERM\_AVE} * R1\_calc * q}{2 * k * \ln\left(\frac{Q4_{AREA}}{Q3_{AREA}}\right)} = 316.05 \text{ K} = 43.05° \text{ C}.$$

From the foregoing, the effects of the temperature coefficient can be separated from the resistor tolerance of R1, as follows:

$$Rtol = 100 * \left[\frac{R1\_calc}{R1 * [1 + R\_TC1 * (Tdev - Tnom) + R\_TC2 * (Tdev - Tnom)^2]} - 1\right]$$

wherein, Rtol=−8.4%

The thermal shutdown control temperatures $T_{THERM}$ and $T_{WARN}$ operative to trigger thermal shutdown control and warning signals can be calculated as follows:

$$T_{THERM} = \frac{V_{BE\_TH\_Q3} - V_{BE}TC * Tdev}{-V_{BE}TC + 2 * \frac{R2}{R1} * \frac{k}{q} * \ln\left(\frac{Q4_{AREA}}{Q3_{AREA}}\right)}$$
$$= 450.32 \text{ K}$$
$$= 177.32° \text{ C}.$$

$$T_{WARN} = \frac{V_{BE\_TH\_Q4} - V_{BE}TC * Tdev}{-V_{BE}TC + 2 * \frac{R4}{R1} * \frac{k}{q} * \ln\left(\frac{Q4_{AREA}}{Q3_{AREA}}\right)}$$
$$= 413.22 \text{ K}$$
$$= 140.22° \text{ C}.$$

Then, a difference temperature (deltaTemp) between the temperature that triggers a thermal warning condition ($T_{WARN}$) and a thermal shutdown condition ($T_{THERM}$) can be determined as follows:

deltaTemp=$T_{THERM}$−$T_{WARN}$=37.097° C.

In view of the structural and functional examples shown and described above, methodologies for determining thermal shutdown characteristics in accordance with the present invention will be better appreciated with reference to FIGS. 4 and 5. While, for purposes of simplicity of explanation, a methodology is shown and described as executing serially, it is to be understood and appreciated that the methodology is not limited by the order shown, as some aspects may, in accordance with the present invention, occur in different orders and/or concurrently from that shown and described herein. Moreover, not all features shown or described may be needed to implement a methodology in accordance with the present invention. Additionally, such methodology can be implemented in hardware (e.g., one or more integrated circuits), software (e.g., running on a computer, a DSP, an ASIC or the like) or a combination of hardware and software (e.g., implemented in ATE or other measuring and testing equipment).

FIG. 4 depicts a flow diagram of a method that can be implemented for determining thermal shutdown temperature of an associated thermal shutdown control circuit implemented in an integrated circuit. The methodology can be implemented in connection with one or more various stages of the fabrication process, including an intermediate stage, as well as a final test phase after the IC has been encapsulated and packaged. The methodology begins at 200, such as in conjunction with powering up the IC between appropriate voltage rails for energizing the thermal shutdown control circuit at generally normal operating conditions.

At 210, voltage detection is enabled. For instance, voltage detection can be enabled by activating an appropriate switching system in a monitoring systems coupled between an IPTAT current source that is utilized to source current to the thermal shutdown control circuitry. After voltage detection has been enabled, an internal control voltage of the thermal shutdown control circuitry ($V_{THERM}$) is measured. The measured value can be stored for subsequent processing. At 230, current detection is enabled. The current detection can be enabled by selectively activating one or more switches in a monitoring system implemented on the IC associated with the thermal protection control circuitry. At 240, the current being sourced to the thermal shutdown protection control circuit is measured. A current can be measured, for example, by re-routing the current from a current source or a current mirror that is provided to the thermal shutdown control circuitry to an ammeter or other current sensing device.

At 250, a next phase of the test process is activated in which the voltage detection is enabled again. The voltage detection being enabled at 250 can correspond to the same (or different) activation of switches for monitoring the same internal signals as at 210. At 260, a predetermined amount of current is applied to the node associated with the $V_{THERM}$ signal. As a result, the applied current is added to the $I_{THERM}$ current, which causes a corresponding increase in the level of $V_{THERM}$. The $V_{THERM}$ signal can be measured at 270.

At 280, a determination is made as to whether the shutdown device has been activated. If the shutdown devices has not been activated in response to the increased current applied at 260 (NO), the methodology proceeds to 290 in which the current being applied at 260 is incrementally increased. From 290, the method returns to 260 to apply the increased current to the node associated with the $V_{THERM}$ signal.

The loop comprising 260 through 290 can be repeated until, at 280, a determination is made that the shutdown device has been activated. Upon determining that the shutdown device has been activated (YES), the methodology proceeds to 300 in which the thermal shutdown temperature can be determined. As described herein, the thermal shutdown temperature can be determined as a function of the $V_{THERM}$ measured under normal operating conditions (at 220), the $I_{THERM}$ measured under normal operating conditions (at 240), and based on the current applied at 260 and the $V_{THERM}$ measured at 270, which resulted in activation of the shutdown device at 280 (See, e.g., equations supra.). Such computation further can be based on known values of circuit components in the thermal shutdown control circuitry.

FIG. 5 depicts an example of another methodology that can be implemented for determining the activation temperature for a thermal shutdown control circuit. The methodology begins at 300 in which parameters are initialized to their starting values. At 310, the circuit parameters are defined. The circuit parameters can include the nominal values associated with the various circuit components that comprise the thermal shutdown control circuitry. For instance, such parameters can include values of resistors, temperature coefficients for such resistors, applicable constants, as well as temperature coefficients for transistor devices operating within the thermal protection control circuitry.

At 320, measurement data also is provided. The measurement data, for example, can include measurements of internal voltages and currents associated with operation of the thermal protection control circuitry under normal operating conditions, as well as those values associated with activating or changing state of the thermal protection control signal. After the parameters have been defined and data has been provided, at 330, the PTAT resistance is calculated. The PTAT resistance corresponds to the resistance of a negative (or positive) temperature coefficient resistance. The PTAT resistance, for example, can be a value functionally related to an actual resistance measured by the ratio of voltage and current through the resistor, as well as based on the nominal circuit value of such resistance.

At 340, an activation voltage is calculated. The activation voltage, for example, can correspond to a base-emitter threshold voltage ($V_{BE}$) sufficient to turn on a negative temperature coefficient transistor. For instance, the activation voltage can be determined as a function of an aggregate current corresponding to the normal current, plus the added current injected to achieve activation multiplied by the resistance calculated at 330. At 350, the device temperature can be calculated to determine the effects of self-heating associated with the device during the measurements. At 360, the activation temperature associated with the thermal protection control circuitry is calculated. The activation temperature can also employ the device temperature calculated at 350 (e.g., by subtracting out the corresponding temperature associated with self-heating) to provide a more accurate determination of the activation temperature. Those skilled in the art will understand and appreciate that the activation temperature can be determined for both the thermal shutdown control as well as the thermal warning control signals, such as described herein.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An integrated circuit comprising:
    a proportional to absolute temperature (PTAT) generator that provides a PTAT signal that varies as a function of temperature;
    a thermal protection control system that provides an output signal indicative of a thermal protection condition based at least in part on the PTAT signal; and
    a monitoring system coupled to the PTAT generator and to the thermal protection control system that provides a path for a first signal based on the PTAT signal to enable selective measuring of at least one signal associated with operation of the thermal protection control system, wherein the monitoring system further comprises a first component that operates, based on at least one mode control signal, to selectively measure an internal signal of the thermal protection control system, the internal signal being based on the first signal.

2. The integrated circuit of claim 1, wherein the internal signal comprises a current signal, the first component being operative to redirect the current signal, based on the at least one mode control signal, for measuring the current signal.

3. The integrated circuit of claim 1, wherein the internal signal comprises a voltage signal, the first component being operative to provide a path, based on the at least one mode control signal, for measuring the voltage signal.

4. The integrated circuit of claim 3, wherein the first component is further operative to provide a path for injecting current to the thermal protection control system to simulate an increase in temperature.

5. The integrated circuit of claim 1, further comprising:
    a first terminal coupled to enable selective monitoring of a first electrical parameter associated with operation of the thermal protection control system; and
    a second input coupled to enable selective monitoring of a second electrical parameter associated with operation of the thermal protection control system.

6. The integrated circuit of claim 5, wherein the integrated circuit further comprises an integrated circuit at one of a intermediate stage of fabrication and a final stage of fabrication.

7. A test system in combination with the integrated circuit of claim 1, further comprising a test control system that provides the at least one mode control signal to the monitoring system for enabling the selective measuring the at least one signal associated with operation of the thermal protection control system.

8. The combination of claim 7, further comprising a calculator that computes a value corresponding to at least one thermal protection characteristic of the thermal protection control system based on the indication of the at least one electrical parameter.

9. The combination of claim 8, wherein the value corresponding to at least one thermal protection characteristic comprises an indication of temperature.

10. The combination of claim 7, wherein the monitoring system further comprises:
    a first component that operates, based on a first mode control signal from the test control system, to redirect current from the thermal protection control system for measurement by the test control system; and
    a second component that operates, based on a second mode control signal from the test control system, to selectively couple a control voltage of the thermal protection system for measurement by the test control system.

11. The combination of claim 10, wherein the second component is further operative to provide a path for injecting current to the thermal protection control system to simulate an increase in temperature, the test system identifying an amount of injected current and the control voltage that causes the output signal from the thermal protection control system to change states.

12. The combination of claim 11, further comprising a calculator that computes an indication of a thermal shutdown temperature based on the voltage and current measured by the test control system.

* * * * *